United States Patent
Reader et al.

(10) Patent No.: US 11,858,387 B2
(45) Date of Patent: Jan. 2, 2024

(54) SEAT ASSEMBLY

(71) Applicant: GM GLOBAL TECHNOLOGY OPERATIONS LLC, Detroit, MI (US)

(72) Inventors: Edeena Alicia Reader, Canton, MI (US); Edward Thaddeus Kuczynski, Ann Arbor, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 17/711,097

(22) Filed: Apr. 1, 2022

(65) Prior Publication Data

US 2023/0311726 A1 Oct. 5, 2023

(51) Int. Cl.
| | | |
|---|---|---|
| *A47C 7/72* | (2006.01) | |
| *B60N 2/56* | (2006.01) | |
| *B60N 2/06* | (2006.01) | |
| *B60N 2/879* | (2018.01) | |
| *B60N 2/64* | (2006.01) | |

(52) U.S. Cl.
CPC ......... *B60N 2/5635* (2013.01); *B60N 2/5642* (2013.01); *B60N 2/5685* (2013.01); *B60N 2/64* (2013.01); *B60N 2/879* (2018.02)

(58) Field of Classification Search
CPC .............................. B60N 2/5657; B60N 2/5642
See application file for complete search history.

(56) References Cited

U.S. PATENT DOCUMENTS

| | | | | |
|---|---|---|---|---|
| 6,976,734 B2 * | 12/2005 | Stoewe | ................ | B60N 2/5635 297/180.13 |
| 7,475,938 B2 * | 1/2009 | Stoewe | ................ | B60N 2/5657 297/180.13 |
| 8,167,368 B2 * | 5/2012 | Eckel | .................... | B60N 2/565 297/180.13 |
| 8,662,579 B2 * | 3/2014 | Yoshizawa | ........... | B60N 2/5657 297/180.13 |
| 9,121,414 B2 * | 9/2015 | Lofy | ....................... | F04D 25/08 |
| 9,562,632 B1 * | 2/2017 | Billman | .................. | B22F 10/20 |
| 10,602,859 B2 * | 3/2020 | Bacallao | ............... | A47F 5/0018 |
| 11,091,073 B2 * | 8/2021 | Lee | ....................... | B60N 2/5678 |
| 11,279,274 B1 * | 3/2022 | Selvasekar | ............... | B60N 2/80 |
| 11,318,869 B2 * | 5/2022 | Greenwood | ......... | B60N 2/5657 |
| 11,524,614 B2 * | 12/2022 | Iacovone | ................. | B60N 2/58 |
| 2009/0022485 A1 * | 1/2009 | Madden | ................. | A47K 10/48 392/382 |
| 2009/0031899 A1 * | 2/2009 | Gay | .................... | B01D 53/0407 96/118 |
| 2009/0033130 A1 * | 2/2009 | Marquette | ................ | A47C 7/74 297/180.15 |

(Continued)

*Primary Examiner* — Shin H Kim
(74) *Attorney, Agent, or Firm* — CANTOR COLBURN LLP

(57) ABSTRACT

A ventilation system for a seat cushion comprises a reticulated ventilation manifold disposed in the seat cushion. The ventilation manifold has an inlet disposed adjacent a first side of the cushion and a plurality of manifold ducts extending from the inlet to terminate in outlets disposed at or near openings in a second side of the cushion. A fan motor is attached adjacent the first side of the cushion and has a fan outlet in fluid communication with the inlet of the ventilation manifold. The fan motor operates to apply a positive or a negative pressure, via the fan outlet to the ventilation manifold to supply air through the ventilation manifold and the cushion.

17 Claims, 6 Drawing Sheets

(56) References Cited

U.S. PATENT DOCUMENTS

| | | | |
|---|---|---|---|
| 2009/0218855 A1* | 9/2009 | Wolas | A47C 7/74 |
| | | | 297/180.12 |
| 2010/0102599 A1* | 4/2010 | Itou | B60N 2/5657 |
| | | | 297/452.48 |
| 2013/0264742 A1* | 10/2013 | Ota | B60N 2/5657 |
| | | | 264/266 |
| 2018/0043805 A1* | 2/2018 | Baek | B60N 2/64 |
| 2018/0070736 A1* | 3/2018 | Achten | A47C 23/002 |
| 2018/0187348 A1* | 7/2018 | Mueller | B32B 5/026 |
| 2018/0228302 A1* | 8/2018 | Bacallao | A47F 7/0071 |
| 2019/0298072 A1* | 10/2019 | Bhatia | B60N 2/565 |
| 2019/0357695 A1* | 11/2019 | Achten | B33Y 10/00 |
| 2020/0215949 A1* | 7/2020 | Carles | B60N 2/806 |
| 2021/0154610 A1* | 5/2021 | Carredo | A62B 23/02 |
| 2021/0162904 A1* | 6/2021 | Lee | B60N 2/5621 |
| 2021/0259425 A1* | 8/2021 | Michalak | A47C 7/282 |
| 2021/0300218 A1* | 9/2021 | Greenwood | B60N 2/5657 |
| 2021/0339661 A1* | 11/2021 | Pacilli | B60N 2/5642 |
| 2021/0339662 A1* | 11/2021 | Iacovone | B60N 2/58 |
| 2022/0227266 A1* | 7/2022 | Ofner | B60N 2/70 |
| 2023/0129527 A1* | 4/2023 | Kimbara | B60N 2/62 |
| | | | 297/284.1 |

* cited by examiner

SEAT ASSEMBLY

INTRODUCTION

The subject disclosure relates to automotive seat assemblies and, more particularly, to a seat assembly having ventilation and support for occupant comfort.

Changes in customer expectations have resulted in demands for vehicle features that address higher levels of convenience and comfort. Desires for higher levels of connectivity and on-board entertainment drive increasingly complex infotainment systems, for instance. Vehicle seats have evolved from simple seats attached to a floor mounted frame to highly complex seating systems. An example of features commonly found in today's seating offerings may include multiple electric motors and switching apparatus to allow virtually unlimited adjustment of seating surfaces, lumbar adjusters, haptic devices for alerting the occupant of various vehicle conditions, safety air bags and climate control systems. The climate control systems can be used to heat, cool, and ventilate the seat.

As the number of features being added to seats have proliferated, packaging has become a serious consideration. As with most vehicle systems, component envelopes are fixed by the size and structure of the vehicle. Simply increasing the size of the seat is not an option. It is desirable to obtain a climate control system for a seating system that is compact and also adds to the overall comfort and support of the seat.

SUMMARY

In one exemplary embodiment a ventilation system for a seat cushion comprises a ventilation manifold, comprising a reticulated material, disposed in the seat cushion. An inlet is disposed adjacent a first side of the seat cushion and a plurality of manifold ducts extends from the inlet to terminate in a series of outlets disposed at or near openings in a second side of the seat cushion. A fan motor is positioned adjacent the first side of the seat cushion and has a fan outlet in fluid communication with the inlet of the ventilation manifold, wherein the fan motor operates to apply one of a positive or a negative pressure, via the fan outlet, to the ventilation manifold to supply air through, the ventilation manifold and the seat cushion.

In addition to one or more of the features described herein the fan motor moves air, via the fan outlet, through the ventilation manifold, from one of the first side to the second side or from the second side to the first side of the seat cushion.

In addition to one or more of the features described herein the reticulated material is constructed from one or more of a foam, a polymeric material, or other elastomeric material.

In addition to one or more of the features described herein the ventilation manifold is molded in place during construction of the seat cushion.

In addition to one or more of the features described herein the ventilation manifold is 3-D printed.

In addition to one or more of the features described herein the ventilation manifold further comprises a plenum having a plenum upper surface disposed adjacent the first side of the seat cushion. The plurality of ducts extends from the plenum upper surface, through the cushion, to terminate in a series of outlets disposed at or near openings in the second side of the seat cushion. An air impermeable seal membrane closes a plenum lower surface to prevent air flow therethrough and an opening in the seal membrane receives the fan outlet of the fan motor therein for fluid connection with the plenum.

In addition to one or more of the features described herein the impermeable seal membrane is constructed of one of a plastic sheeting, a resin impregnated material or a combination thereof.

In addition to one or more of the features described herein the impermeable seal membrane is attached to the plenum lower surface using an adhesive sealant.

In another exemplary embodiment a seating assembly for a vehicle comprises a seat bottom subassembly, a backrest subassembly pivotably connected to the seat bottom subassembly and configurated to pivot with respect to seat bottom subassembly, a rail assembly configured to secure the seating assembly to a floor surface of the vehicle and, a seat bottom frame supporting the seating assembly and slidably engaging the rail assembly to permit the seating assembly to move longitudinally fore and aft within a passenger compartment of the vehicle. The seat bottom subassembly comprises a seat bottom cushion supported on the seat bottom frame. A ventilation system is integrated with the seat bottom cushion and comprises a ventilation manifold, comprising a reticulated material, disposed in the seat bottom cushion, and having an inlet disposed adjacent the bottom of the seat bottom cushion and a plurality of manifold ducts extending from the inlet to terminate in a series of outlets disposed at or near openings in the top of the seat bottom cushion. A fan motor is attached to or positioned adjacent the bottom of the seat bottom cushion and has a fan outlet in fluid communication with the inlet of the ventilation manifold wherein the fan motor operates to apply one of a positive or a negative pressure, via the fan outlet, to the ventilation manifold to supply air through, the ventilation manifold and the cushion.

In addition to one or more of the features described herein the fan motor moves air, via the fan outlet, through the ventilation manifold, from one of the bottom to the top or from the top to the bottom of the seat bottom cushion.

In addition to one or more of the features described herein the reticulated material is constructed from one or more of a foam, a polymeric material, or other elastomeric material.

In addition to one or more of the features described herein the ventilation manifold is molded in place during construction of the seat bottom cushion.

In addition to one or more of the features described herein the ventilation manifold is 3-D printed.

In addition to one or more of the features described herein the ventilation manifold further comprises a plenum having a plenum upper surface disposed adjacent the bottom of the seat bottom cushion. The plurality of ducts extends from the plenum upper surface, through the seat bottom cushion, to terminate in a series of outlets disposed at or near openings in the top of the seat bottom cushion. An air impermeable seal membrane closes a plenum lower surface to prevent air flow therethrough and an opening in the seal membrane receives the fan outlet of the fan motor therein for fluid connection with the plenum.

In addition to one or more of the features described herein the impermeable seal membrane is constructed of one or more of a plastic sheeting and a resin impregnated material.

In addition to one or more of the features described herein the impermeable seal membrane is attached to the plenum lower surface using an adhesive sealant.

In yet another exemplary embodiment a seating assembly for a vehicle comprises a seat bottom frame. A seat bottom subassembly, supported by the seat bottom frame, comprises a seat bottom cushion supported on the seat bottom frame and a ventilation system integrated with the seat bottom cushion. The ventilation system comprises a ventilation manifold, comprising a reticulated material, disposed in the seat bottom cushion, and having an inlet disposed adjacent the bottom of the seat bottom cushion and a plurality of manifold ducts extending from the inlet to terminate in a series of outlets disposed at or near openings in the top of the seat bottom cushion. A fan motor is attached adjacent to, or adjacent to, the bottom of the seat bottom cushion and has a fan outlet in fluid communication with the inlet of the reticulated ventilation manifold. The fan motor operates to apply one of a positive or a negative pressure, via the fan outlet, to the ventilation manifold to supply air through, the reticulated ventilation manifold and the seat bottom cushion.

In addition to one or more of the features described herein the ventilation manifold further comprises a plenum having a plenum upper surface disposed adjacent the bottom of the seat bottom cushion. The plurality of ducts extends from the plenum upper surface, through the seat bottom cushion, to terminate in a series of outlets disposed at or near openings in the top of the seat bottom cushion. An air impermeable seal membrane closes a plenum lower surface to prevent air flow therethrough and an opening in the seal membrane receives the fan outlet of the fan motor therein for fluid connection with the plenum.

In addition to one or more of the features described herein the reticulated material is constructed from one or more of a foam, a polymeric material, or other elastomeric material.

In addition to one or more of the features described herein the ventilation manifold is molded in place during construction of the seat bottom cushion.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
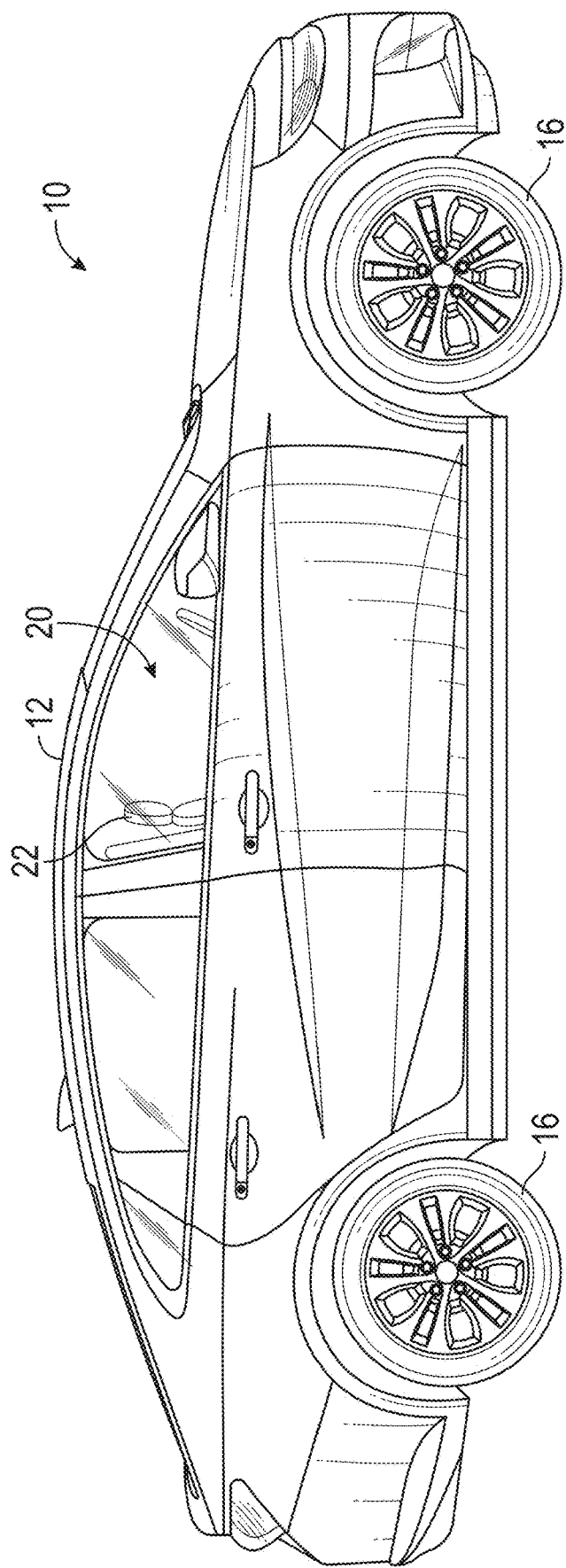
FIG. 1 is a view of a vehicle embodying features of the disclosure.

The following description is merely exemplary in nature and is not intended to limit the present disclosure, its application or uses. It should be understood that throughout the drawings, corresponding reference numerals indicate like or corresponding parts and features.

A vehicle, in accordance with a non-limiting example, is indicated generally at 10 in FIG. 1. Vehicle 10 includes a body 12 supported on a frame (not shown) and a plurality of wheels, one of which is indicated at 16. Body 12 includes a passenger compartment 20 that includes at least one seating assembly 22.

Figure 2:
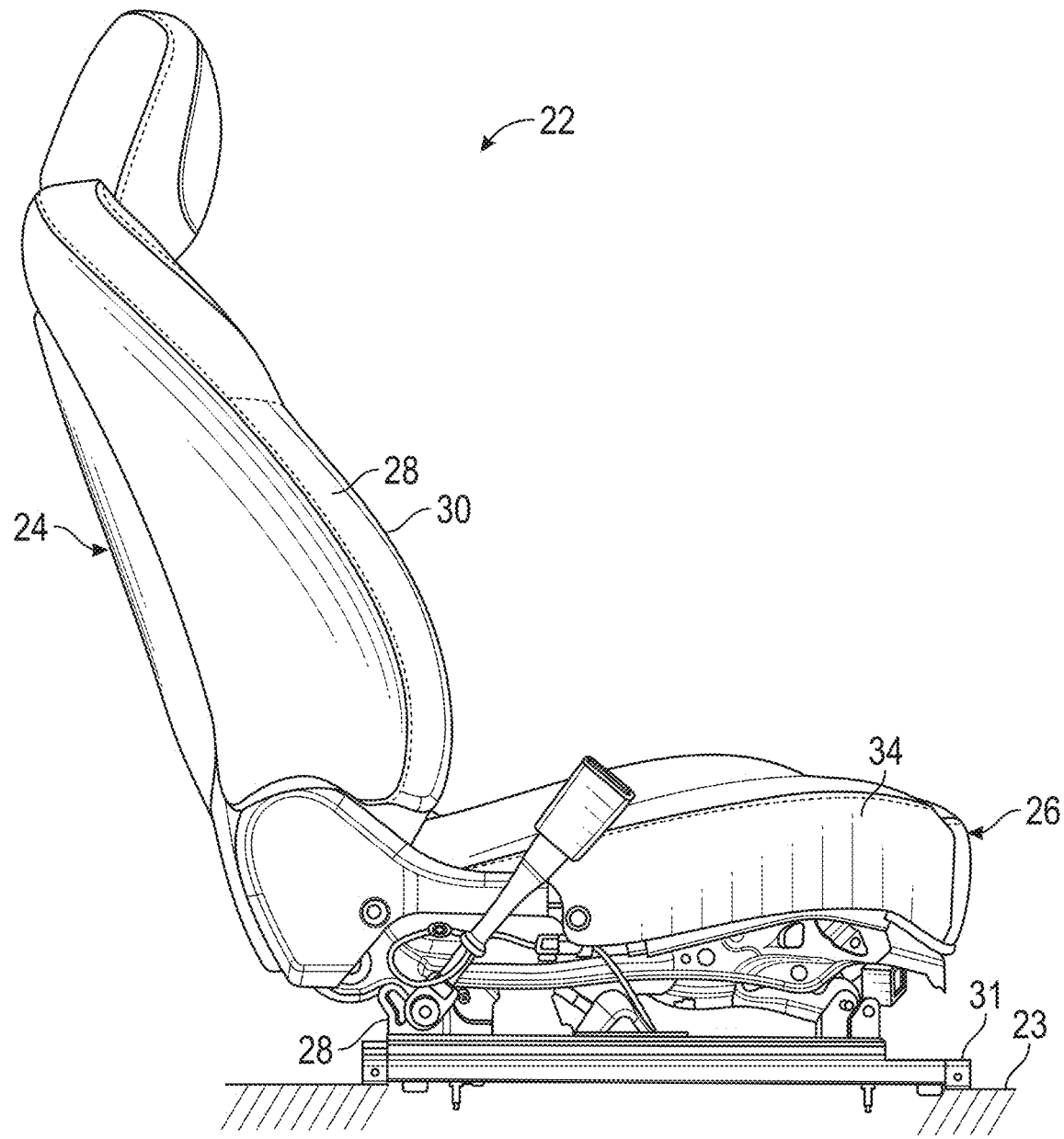
FIG. 2 is a side view of a seating assembly embodying features of the disclosure.

Referring to FIG. 2, a seating assembly 22 is disclosed. The seating assembly 22 may be used in any vehicle 10 including, but not limited to, automobiles, trucks, busses, trains, and aircraft, for example. The seating assembly 22 includes a backrest subassembly (backrest) 24 that is pivotably connected to a seat bottom subassembly (seat bottom) 26. As indicated, the backrest 24 may be configured to pivot with respect to seat bottom 26 to provide an adjustable back support for an occupant of the seating assembly 22. The backrest 24 may include an inner frame member (not shown) that supports one or more foam cushion portions 28 and an upholstery trim covering 30 disposed over the cushion portion(s).

In an embodiment, the seat bottom 26 may include a rail assembly 31 which is configured to secure the seating assembly 22 to a floor surface 23 of vehicle 10. A seat bottom frame 28 supports the seating assembly 22 and slidably engages the rail assembly 31 to permit the seating assembly 22 to move longitudinally fore and aft within the passenger compartment 20, in an embodiment.

The seat bottom frame 28 attaches to the rail assembly 31 and provides a generally horizontal surface to support the seat bottom 26 thereon. A seat bottom cushion 34 is supported on the seat bottom frame 28 and is configured to support a significant portion of a seated occupant. The seat bottom cushion 34 flexes to accommodate both the weight of the occupant and any impact forces acting in a generally downward direction as the vehicle 10 encounters bumps or otherwise jostles the occupant. As such, ensuring the comfort of the seat bottom cushion 34 can be an important focus.

Figure 3:
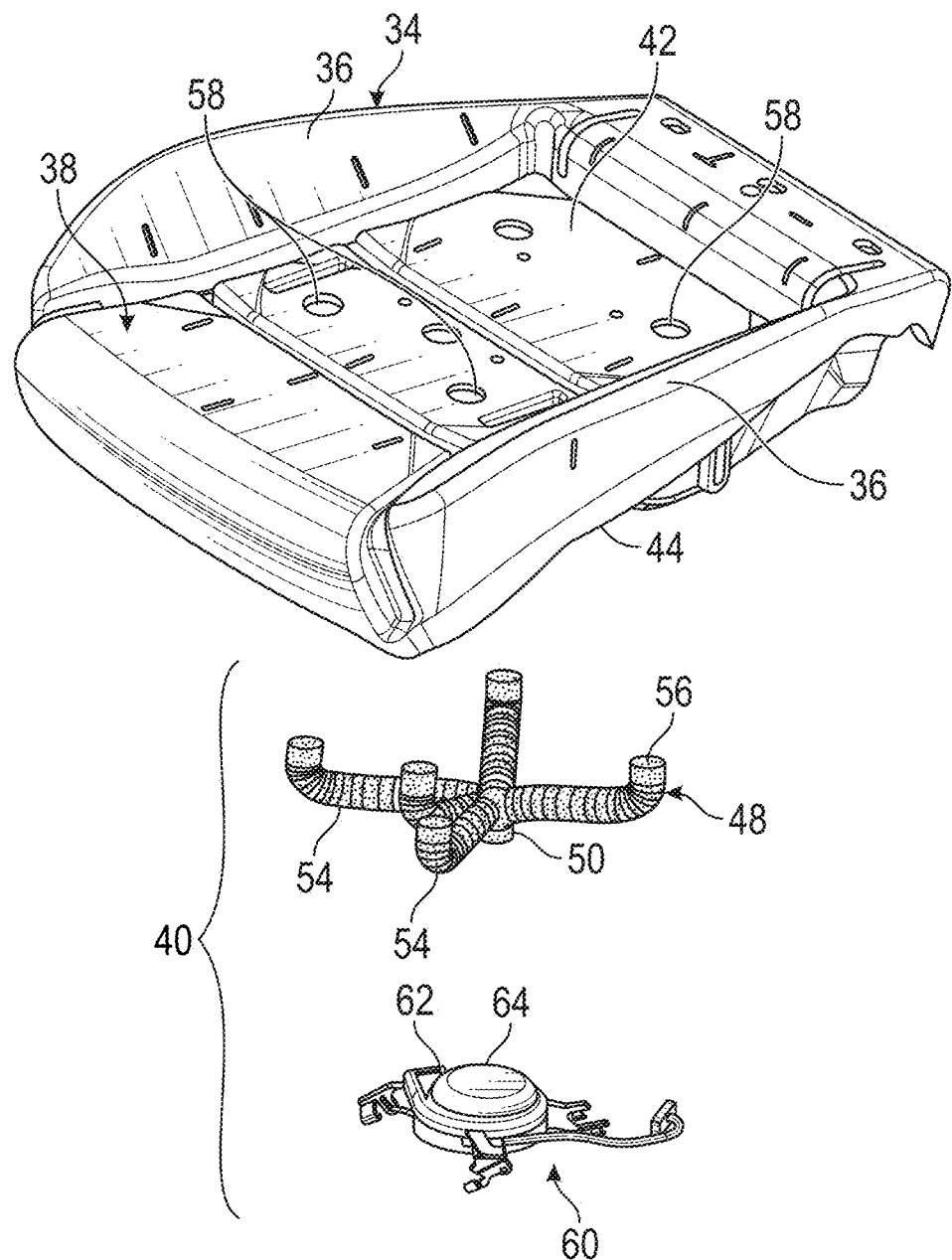
FIG. 3 is a partially disassembled view of a seat bottom subassembly of the seating assembly illustrated in FIG. 2.

Referring to FIG. 3, with continuing reference to FIG. 2, the seat bottom cushions 28 and 34 may be constructed of any suitable material including polyurethane, TDI and MDI foams and in some cases, combinations thereof. Varying materials may allow for the manufacture of cushions with more supportive or firmer bolsters 36 and softer inserts or center portions 38.

A ventilation system 40 may, in an embodiment, be integrated with the seat bottom 26. A similar ventilation system is envisioned for the backrest 24 and the description provided herein applies equally thereto. The ventilation system 40 is configured to create an airflow through the seat bottom cushion 34 to enhance the comfort of an occupant seated thereon. The ventilation system 40 may draw air through the seat bottom cushion 34, from a second side (i.e. a cushion top) 42 to a first side (i.e. a cushion bottom) 44, or may force air through the seat bottom cushion, from cushion bottom 44 to cushion top 42.

Figure 4:
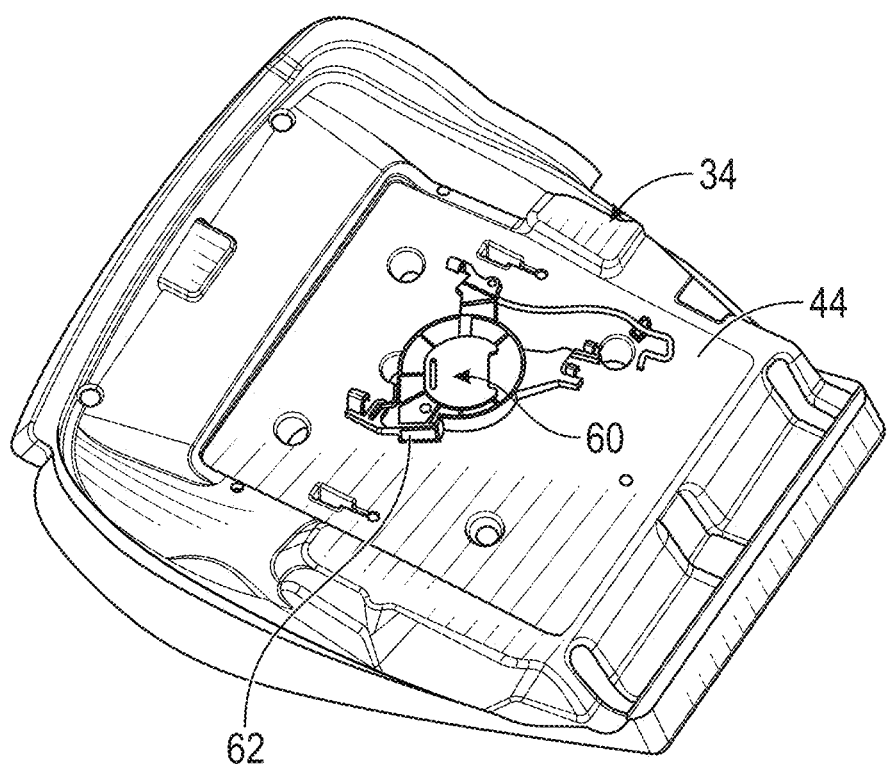
FIG. 4 is a bottom view of the seat bottom subassembly of FIG. 3.

In an embodiment, the ventilation system 40 includes a ventilation manifold 48 that is disposed integrally within the seat bottom cushion 34. In the embodiment illustrated in FIG. 3, the ventilation manifold 48 comprises an octopus configuration having an inlet 50, disposed at or near the cushion bottom 44, and a plurality of manifold branches or ducts 54, extending from the inlet 50 to terminate in a series of outlets 56 disposed at or near openings 58 in the cushion top 42. A fan motor 60, FIGS. 3 and 4, having an inlet 62 and an outlet 64 is attached adjacent to, or positioned near, the cushion bottom 44 with the fan outlet 64 fluidly connected to the inlet 50 of the ventilation manifold 48. The fan motor 60 may operate to apply a positive or a negative pressure, via outlet 64 to the ventilation manifold 48. As a result, the terminology fan outlet and fan inlet are only for descriptive purposes as their functions may be reversed depending upon the application of a positive or negative pressure and the resultant direction of air movement through the manifold, as described.

In an embodiment, the ventilation manifold 48 is constructed of a reticulated material (i.e. reticulated ventilation manifold) such as foam, polymeric material, metal, or other elastomeric material arranged in a reticulated manner offering free air movement through its volume while providing resiliency to support the cushion. The reticulated material can be molded, printed, spun, formed through reaction, or other manufacturing means.

The reticulated material, being very porous, allows air to flow through the ventilation manifold 48 when a positive or negative pressure is applied thereto, via the fan motor 60. The reticulated material may be an organic polymer such as polyurethane, a ceramic, or a metal and the ventilation manifold 48 may be molded or 3-D printed prior to the molding of the seat bottom cushion 34. Subsequently, the ventilation manifold 48 may be molded in place during construction of the seat bottom cushion 43. In an embodiment, the seat bottom cushion 34 is molded of a polyurethane foam. Alternately, the ventilation manifold 48 may be mechanically inserted into an already molded seat bottom cushion 34. The seating assembly 22 having a seat bottom cushion 34 with the ventilation manifold 48 constructed of the reticulated material, provides consistent occupant support across the seat bottom cushion 34; avoiding discontinuities in occupant support that may be caused by plastic molded ventilations ducts, for instance. In an embodiment, the reticulated foam or appropriate resilient open-cell material matrix may vary in firmness (i.e. firmer or less firm) relative to the adjacent seat padding material to provide a desired occupant support.

Figure 5:
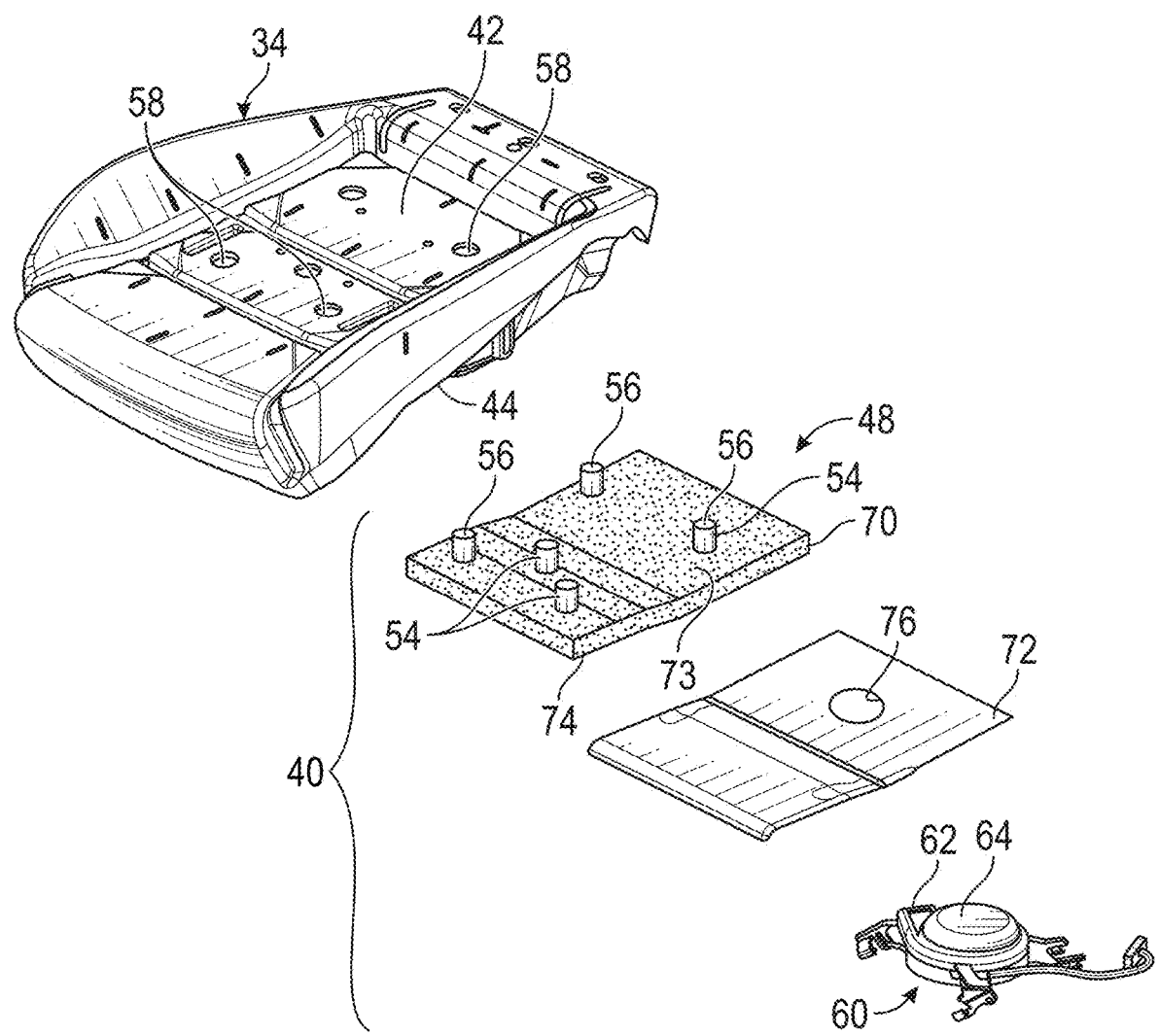
FIG. 5 is a partially disassembled view of a seat bottom subassembly of the seating assembly illustrated in FIG. 2 in another embodiment.
Figure 6:
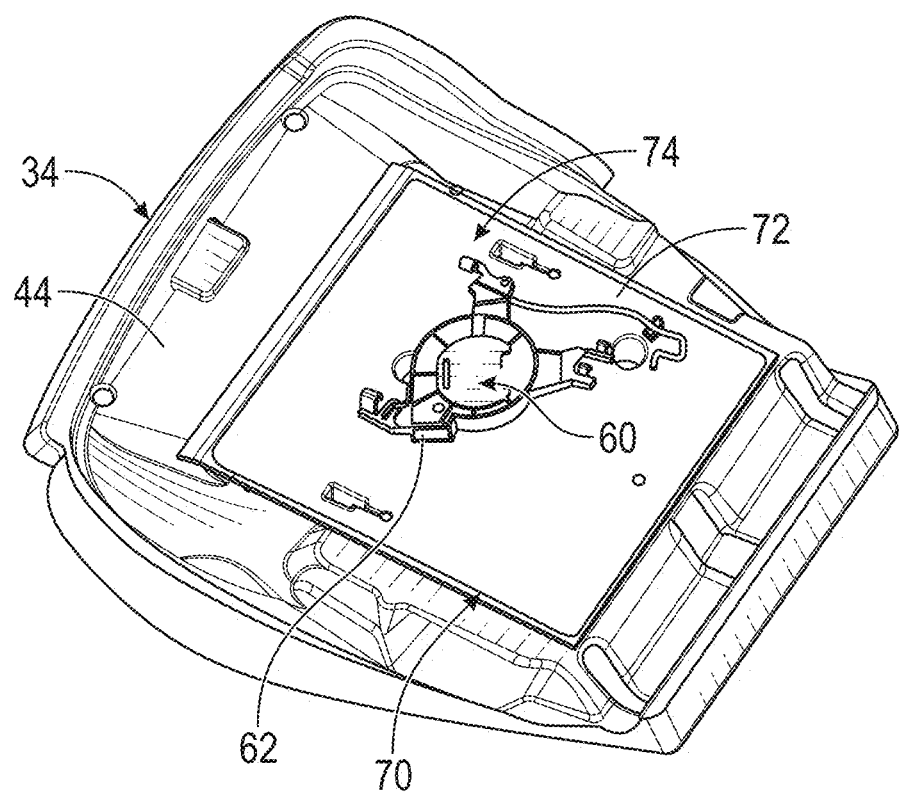
FIG. 6 is a bottom view of the seat bottom subassembly of FIG. 3 in another embodiment.

In another embodiment illustrated in FIGS. 5 and 6, the ventilation system 40 includes the ventilation manifold 48 that extends below and through the seat bottom cushion 34. The ventilation manifold 48 comprises a plenum 70 disposed at or near the cushion bottom 44. A plenum upper surface 73 is located adjacent the cushion bottom 44 and includes a plurality of ducts 54, extending from the plenum upper surface 73, through seat bottom cushion 34, to terminate in a series of outlets 56 disposed at or near openings 58 in the cushion top 42.

In an embodiment, the ventilation manifold 48 is constructed of a reticulated material (i.e. reticulated ventilation manifold). The reticulated material allows air to flow through the plenum material from, for example, the cushion bottom 44 to, and through, the plurality of ducts 54, or vice-versa. The ventilation manifold 48 may be molded, or 3-D printed prior to the molding of the seat bottom cushion 34. Subsequently, the ventilation manifold 48 is molded in place during construction of the seat bottom cushion 34. Alternately, the ventilation manifold 48 may be mechanically inserted into an already molded seat bottom cushion 34. The seating assembly 22 having a seat bottom cushion 34 with a reticulated ventilation manifold 48 provides consistent occupant support across the seat bottom cushion 34 and avoids discontinuities in occupant support that may be caused by plastic molded ventilations ducts, for instance. In an embodiment, the reticulated foam, or appropriate resilient open-cell material matrix may vary in firmness (i.e. firmer or less firm) relative to the adjacent seat padding material to provide the desired occupant support. In an embodiment, the plenum 70, of the ventilation manifold 48, may have a Compression Force Deflection (CFD) that is 0-2 times that of the seat bottom cushion 34.

A plenum lower surface 74 receives an air impermeable seal such as a membrane 72 that operates to close the plenum lower surface 74 to prevent air flow therethrough. The seal membrane 72 may be constructed of plastic sheeting such as polyethylene, polypropylene, or other suitable polymer membrane or a resin impregnated material such as resin impregnated felt or other woven or non-woven material, which provides the desired impermeability and durability. In an embodiment, the seal membrane 72 is attached to the plenum lower surface 74 using an adhesive sealant or other suitable fastening means. An opening 76 is provided in the seal membrane 72 and receives the outlet 64 of the fan motor 60 therein for fluid connection with the plenum 70 of the ventilation manifold 48. The fan motor 60 may operate to apply a positive or a negative pressure, via outlet 64 to the ventilation manifold 48.

While the above disclosure has been described with reference to exemplary embodiments, it will be understood by those skilled in the art that various changes may be made, and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed but will include all embodiments falling within the scope thereof.

What is claimed is:

1. A ventilation system for a seat cushion comprising:
   a ventilation manifold, comprising a reticulated material, disposed in the seat cushion, comprising:
     a plenum having a plenum upper surface disposed adjacent the first side of the seat cushion and a plenum lower surface;
     an inlet disposed in the plenum upper surface adjacent a first side of the seat cushion; and
     a plurality of manifold ducts extending from the plenum upper surface, through the seat cushion to terminate in a series of outlets disposed at or near openings in a second side of the seat cushion; and
   a fan motor attached adjacent the first side of the seat cushion and having a fan outlet in fluid communication with the inlet of the ventilation manifold, wherein the fan motor operates to apply one of a positive or a negative pressure, via the fan outlet, to the ventilation manifold to supply air to through the ventilation manifold and the seat cushion;
   an air impermeable seal membrane closing the plenum lower surface to prevent air flow therethrough; and
   an opening in the air impermeable seal membrane that receives the fan outlet of the fan motor therein for fluid connection with the plenum.

2. The ventilation system of claim 1, wherein the fan motor moves air, via the fan outlet, through the ventilation manifold, from one of the first side to the second side or from the second side to the first side of the seat cushion.

3. The ventilation system of claim 1, wherein the reticulated material is constructed from one or more of a foam, a polymeric material, or other elastomeric material.

4. The ventilation system of claim 1, wherein the ventilation manifold is molded in place during construction of the seat cushion.

5. The ventilation system of claim 1, wherein the ventilation manifold is 3-D printed.

6. The ventilation system of claim 1, wherein the air impermeable seal membrane is constructed of one of a plastic sheeting, a resin impregnated material or a combination thereof.

7. The ventilation system of claim 1, wherein the air impermeable seal membrane is attached to the plenum lower surface using an adhesive sealant.

8. A seating assembly for a vehicle comprising:
a seat bottom subassembly;
a backrest subassembly pivotably connected to the seat bottom subassembly and configurated to pivot with respect to seat bottom subassembly;
a rail assembly configured to secure the seating assembly to a floor surface of the vehicle; and
a seat bottom frame supporting the seating assembly and slidably engaging the rail assembly to permit the seating assembly to move longitudinally fore and aft within a passenger compartment of the vehicle, wherein the seat bottom subassembly comprises:
  a seat bottom cushion supported on the seat bottom frame, the seat bottom cushion including a bottom; and
  a ventilation system integrated with the seat bottom cushion comprising:
    a ventilation manifold, comprising a reticulated material, disposed in the seat bottom cushion, the ventilation manifold including a plenum having a plenum upper surface disposed adjacent the bottom of the seat bottom cushion having an inlet formed in the plenum upper surface disposed adjacent the bottom of the seat bottom cushion and a plurality of manifold ducts extending from the plenum upper surface, through the seat cushion to terminate in the series of outlets disposed at or near openings in the top of the seat bottom cushion, and a plenum lower surface;
    a fan motor attached adjacent the bottom of the seat bottom cushion and having a fan outlet in fluid communication with the inlet of the ventilation manifold, wherein the fan motor operates to apply one of a positive or a negative pressure, via the fan outlet to the ventilation manifold to supply air to the ventilation manifold and the seat bottom cushion;
    an air impermeable seal membrane closing the plenum lower surface to prevent air flow therethrough; and
    an opening in the air impermeable seal membrane that receives the fan outlet of the fan motor therein for fluid connection with the plenum.

9. The seating assembly of claim 8, wherein the fan motor moves air, via the fan outlet, through the ventilation manifold, from one of the bottom to the top or from the top to the bottom of the seat bottom cushion.

10. The seating assembly of claim 8, wherein the reticulated material is constructed from one or more of a foam, a polymeric material, or other elastomeric material.

11. The seating assembly of claim 8, wherein the ventilation manifold is molded in place during construction of the seat bottom cushion.

12. The seating assembly of claim 8, wherein the ventilation manifold is 3-D printed.

13. The seating assembly of claim 8, wherein the air impermeable seal membrane is constructed of one or more of a plastic sheeting and a resin impregnated material.

14. The seating assembly of claim 8, wherein the air impermeable seal membrane is attached to the plenum lower surface using an adhesive sealant.

15. A seating assembly for a vehicle comprising:
a seat bottom frame;
a seat bottom subassembly, supported by the seat bottom frame, comprising:
  a seat bottom cushion supported on the seat bottom frame; and
  a ventilation system integrated with the seat bottom cushion comprising:
    the ventilation manifold including a plenum having a plenum upper surface disposed adjacent the bottom of the seat bottom cushion having an inlet formed in the plenum upper surface disposed adjacent the bottom of the seat bottom cushion and a plurality of manifold ducts extending from the plenum upper surface, through the seat cushion to terminate in the series of outlets disposed at or near openings in the top of the seat bottom cushion, and a plenum lower surface;
    a fan motor attached adjacent the bottom of the seat bottom cushion and having a fan outlet in fluid communication with the inlet of the ventilation manifold, wherein the fan motor operates to apply one of a positive or a negative pressure, via the fan outlet to the ventilation manifold to supply air through, the ventilation manifold and the seat bottom cushion;
    an air impermeable seal membrane closing the plenum lower surface to prevent air flow therethrough; and
    an opening in the air impermeable seal membrane that receives the fan outlet of the fan motor therein for fluid connection with the plenum.

16. The seating assembly of claim 15, wherein the reticulated material is constructed from one or more of a foam, a polymeric material, or other elastomeric material.

17. The seating assembly of claim 15, wherein the ventilation manifold is molded in place during construction of the seat bottom cushion.

* * * * *